United States Patent [19]

Johnson

[11] Patent Number: 5,087,934
[45] Date of Patent: Feb. 11, 1992

[54] WATERPROOF CAMERA HOUSING

[76] Inventor: John D. Johnson, 10 Rathgar Avenue, London, Earling, England

[21] Appl. No.: 460,160

[22] PCT Filed: Jun. 16, 1988

[86] PCT No.: PCT/GB88/00467
§ 371 Date: Jan. 19, 1990
§ 102(e) Date: Jan. 19, 1990

[87] PCT Pub. No.: WO89/01184
PCT Pub. Date: Feb. 9, 1989

[30] Foreign Application Priority Data

Jul. 23, 1987 [GB] United Kingdom ................ 8717455

[51] Int. Cl.$^5$ ............................................. G03B 17/08
[52] U.S. Cl. ..................................................... 354/64
[58] Field of Search ............................ 354/64; 114/312

[56] References Cited

U.S. PATENT DOCUMENTS

| | | | |
|---|---|---|---|
| 3,026,784 | 3/1962 | Byers | 354/64 |
| 4,071,066 | 1/1978 | Schaeffer | 354/64 |
| 4,771,299 | 9/1988 | Gell, Jr. | 354/64 |

FOREIGN PATENT DOCUMENTS 2233881 1/1974 Fed. Rep. of Germany.
2926224 11/1980 Fed. Rep. of Germany ........ 354/64
86098152 4/1986 Fed. Rep. of Germany.

Primary Examiner—Brian W. Brown
Attorney, Agent, or Firm—Killworth, Gottman, Hagan & Schaeff

[57] ABSTRACT

A waterproof housing is in the form of a generally rectangular collapsible bag (43) made from a flexible waterproof material and which is shaped and dimensioned to accomodate a camera. The bag (43) is provided with a pocket (44) having a lens port (47) and shaped to locate the lens port (47) with respect to the camera lens. Another pocket (50) has a viewing port (52), and is shaped to locate the viewing port (52) with respect to the camera viewfinder. The pockets are provided with respective reinforcements, in the form of annular collars (47, 53), to locate positively the lens port and viewing port with respect to the camera lens and viewfinder respectively. The pocket (50) having the viewing port may be a gaiter made from a flexible rubber material, which permits viewing substantially through the operative range of the viewfinder in the operative environment of the camera.

8 Claims, 11 Drawing Sheets

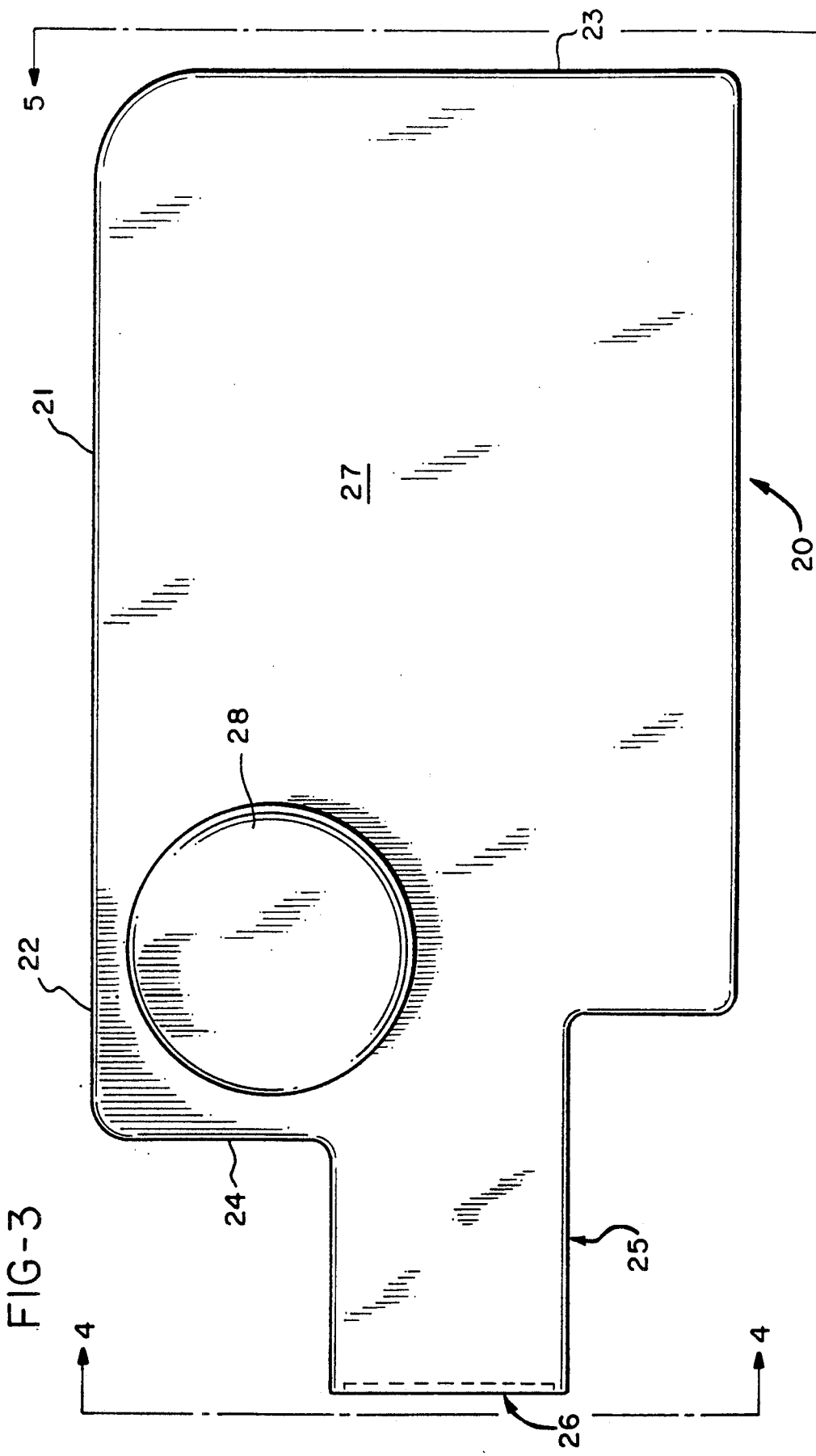

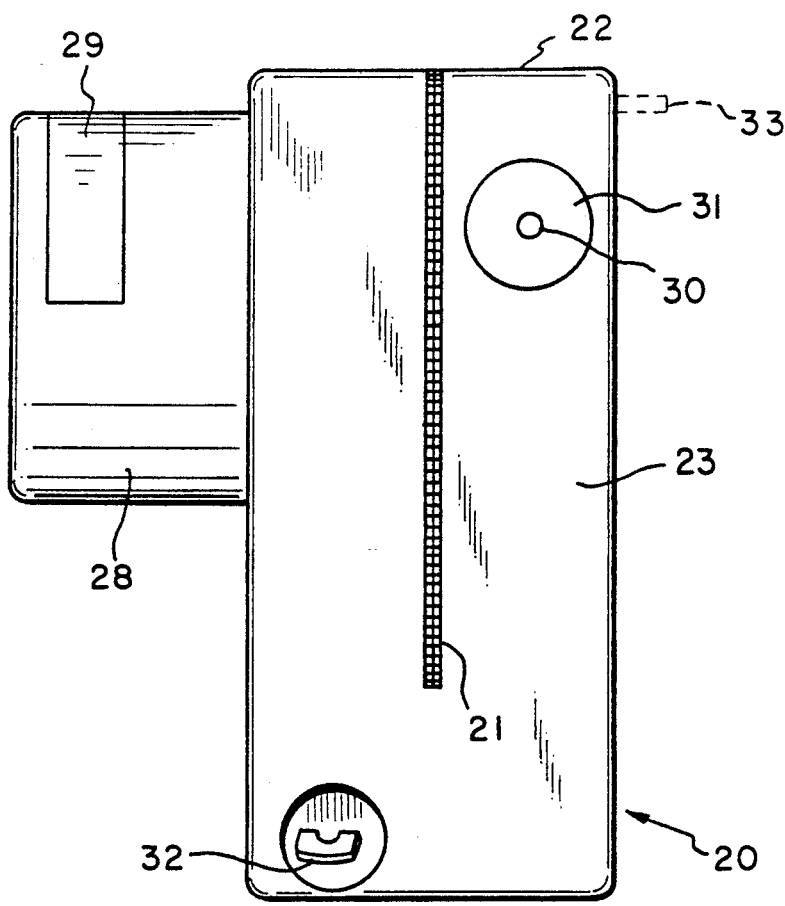
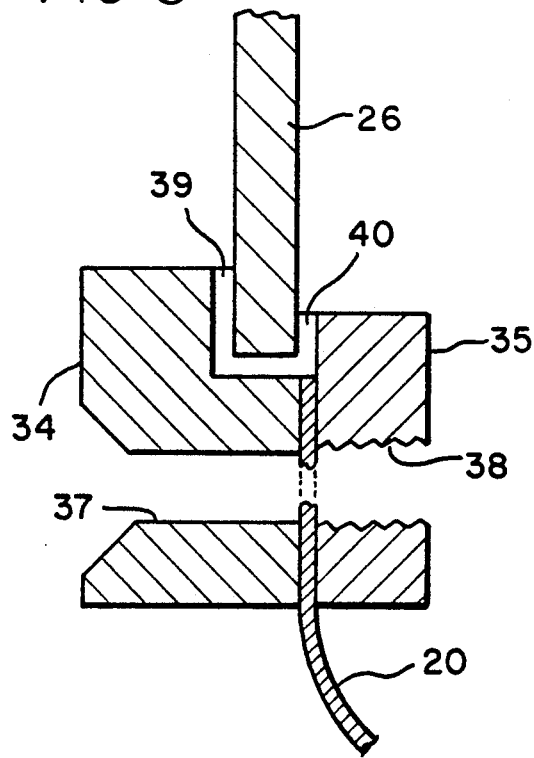
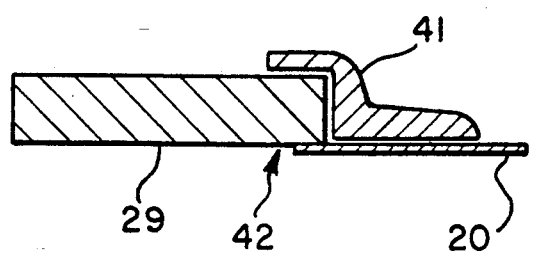

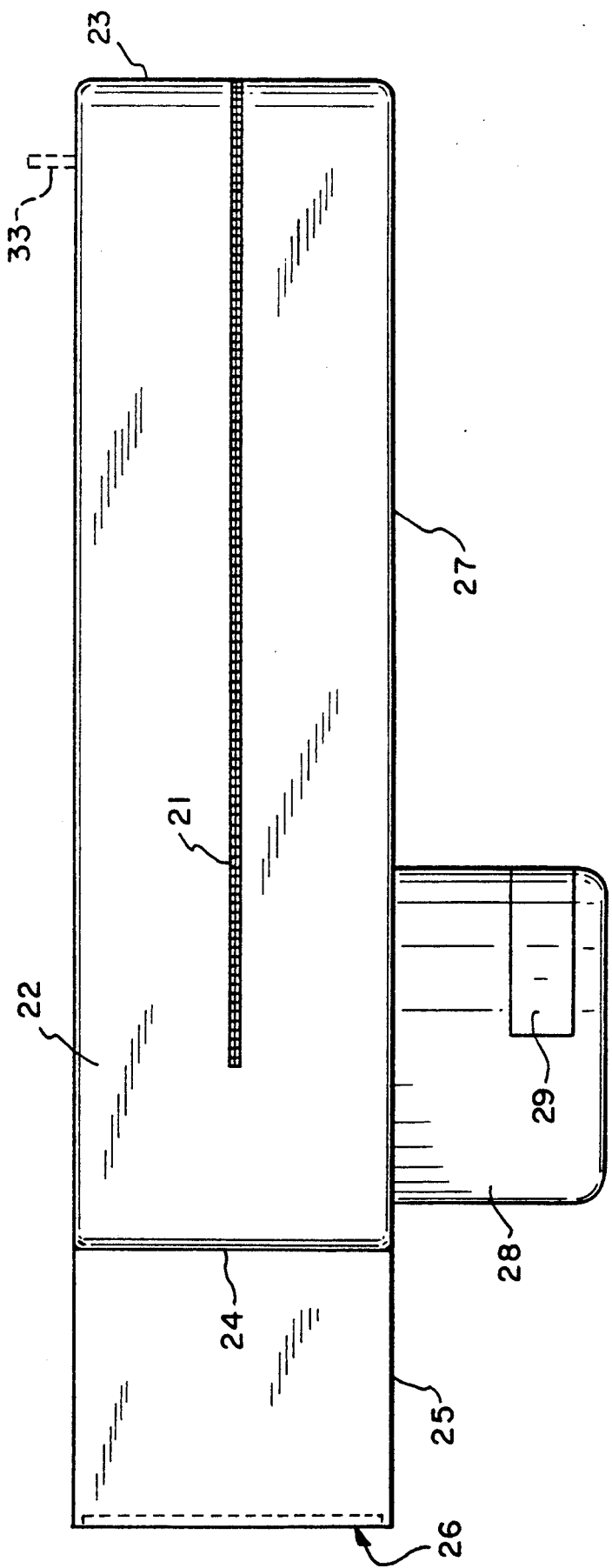

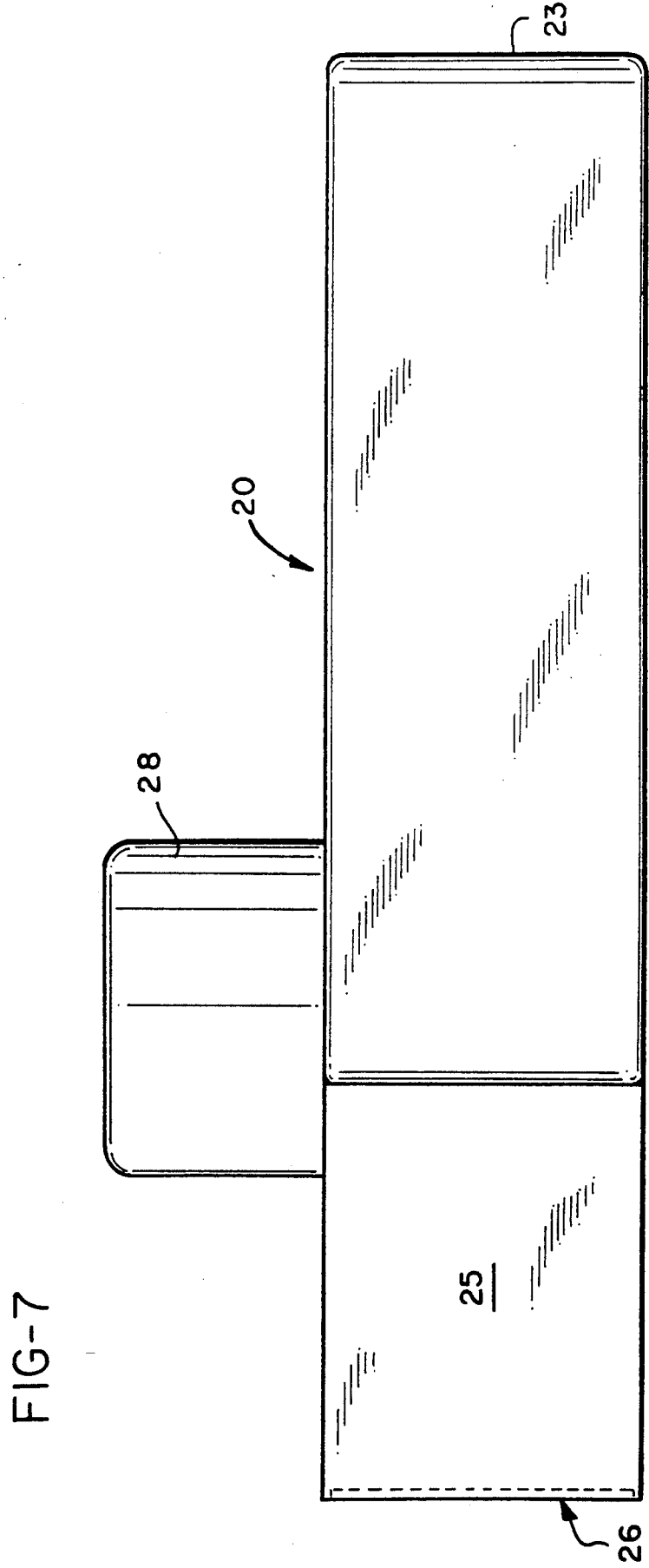

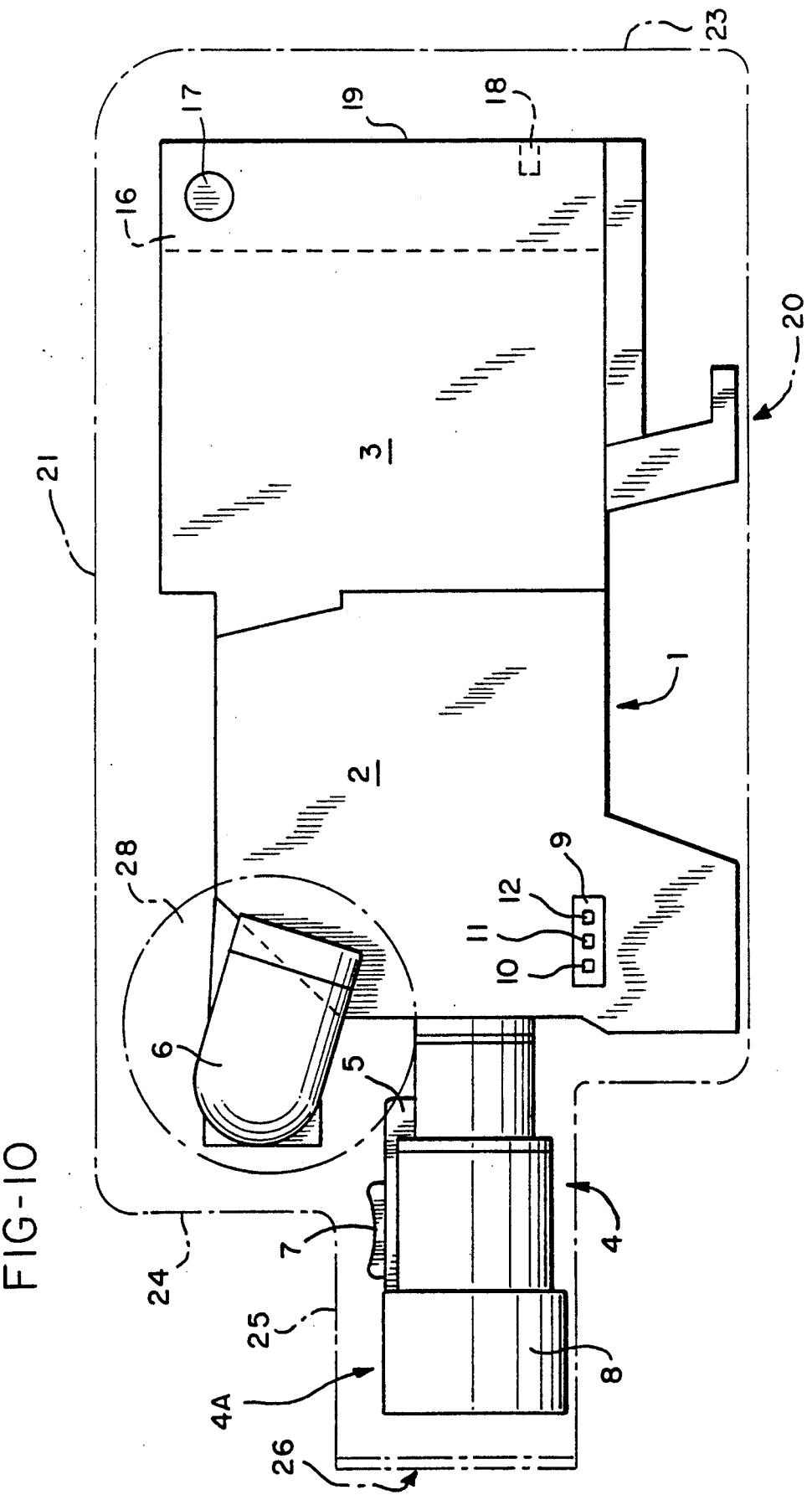

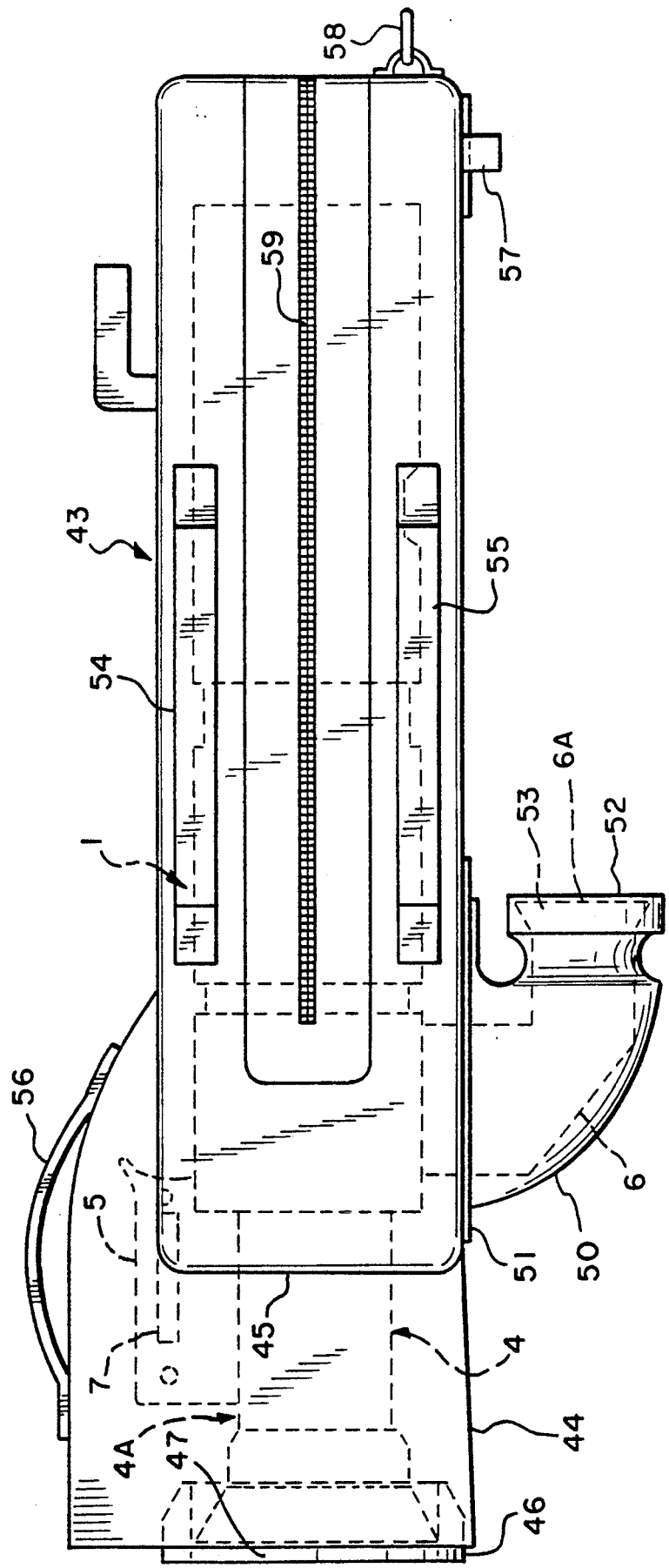

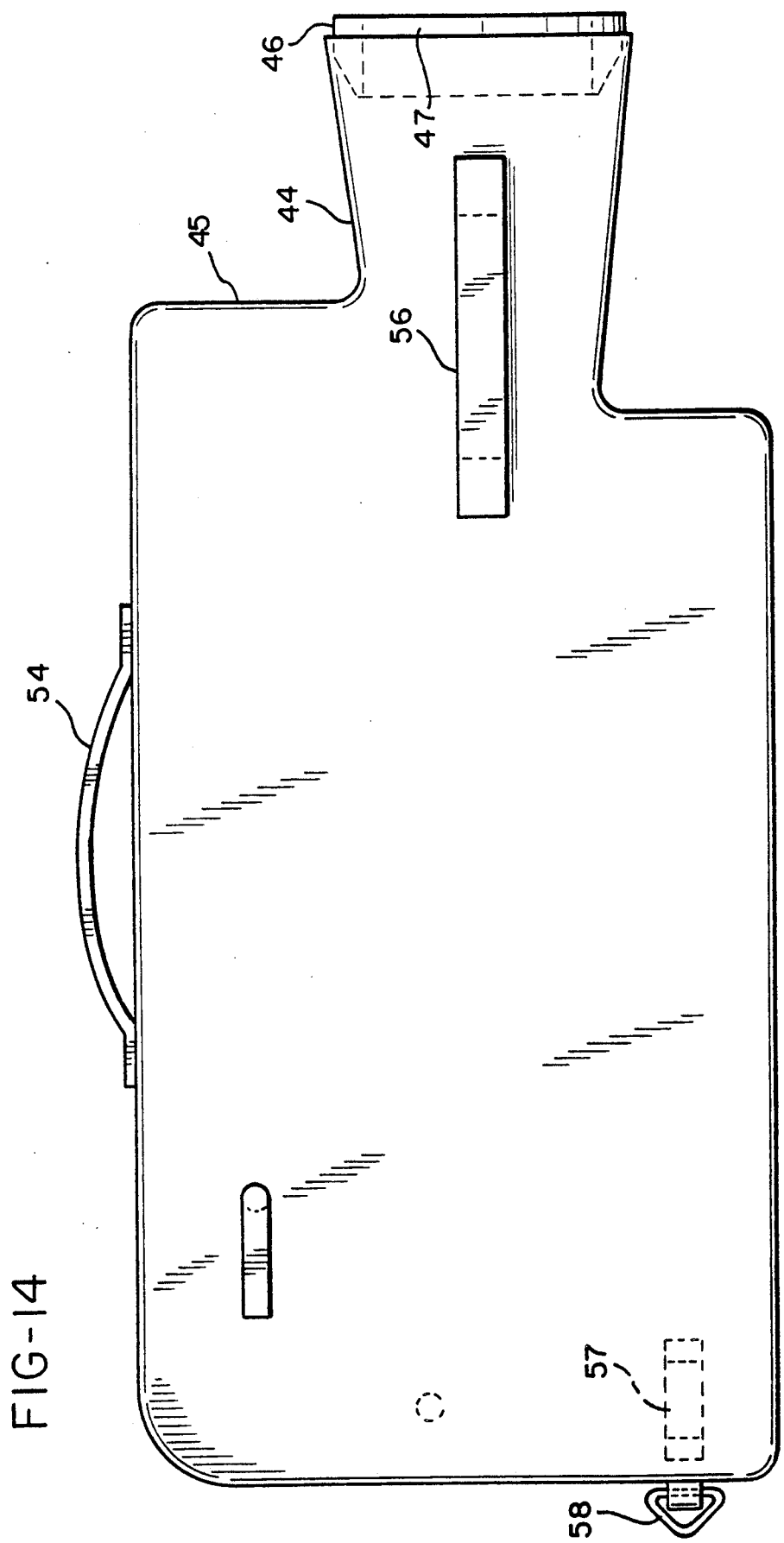

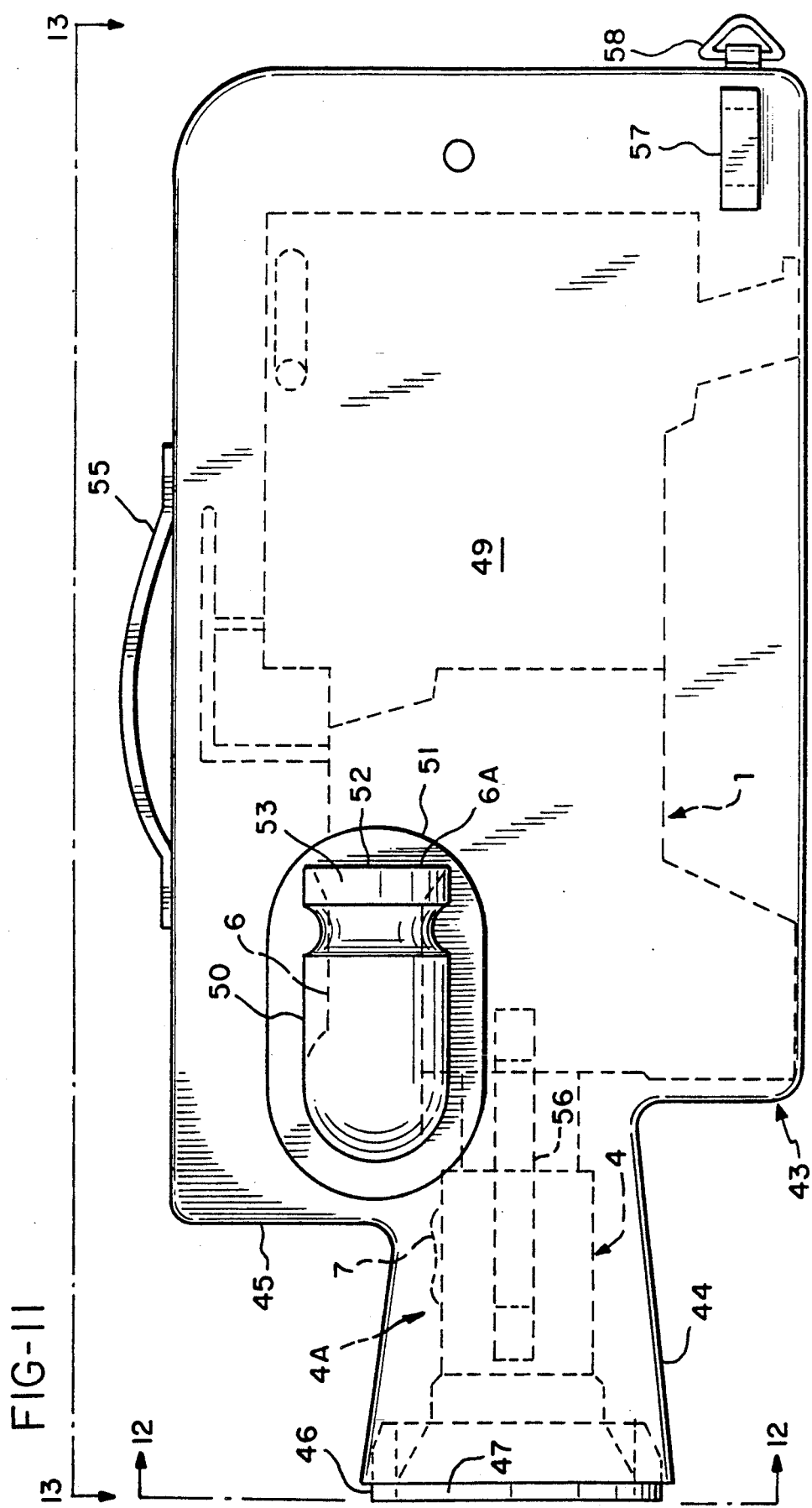

WATERPROOF CAMERA HOUSING

BACKGROUND OF THE INVENTION

This invention relates to waterproof housings or bags for cameras such as video cameras and more particularly to broadcasting cameras.

Broadcasting camera housings are known which can be used underwater down to depths of around 40 meters and remain waterproof. One known housing is made of cast aluminium and the camera controls, inside the housing, are operated by suitable external control mechanism passing in sealing-tight manner through the housing walls. Viewing ports are provided in the housing walls for the camera lens and the viewfinder. Once the camera and housing are assembled, it is not practicable, due to the length of disassembly time, to remove the camera from the housing for use above water. Such underwater housings are very expensive and thus, more often than not, are hired out for use rather than sold outright.

The applicant has identified the need for a waterproof camera housing which is capable of operating about the waterline, i.e. just above and below the waterline e.g. to depths of around 4 to 5 feet (1.25 to 1.75 meters). But for such use the known underwater camera housing referred to in the above paragraph is prohibitively expensive, awkward and heavy.

It has already been proposed to provide a camera housing for use about the waterline, such housing being in the form of a bag made of a flexible waterproof material and having a planar lens port and a planar viewing port. However such a construction is cumbersome, not easy to make, operationally impractical, not commercially viable and location of the lens and viewing ports with respect to the camera lens and viewfinder respectively is difficult. And the viewing port is not suitable for permitting viewing throughout the entire range of the view finder (i.e. that range which is suitable for use in operative environment of the camera), so that it has to be moved around to obtain the operative viewing range.

Accordingly, the main object of the present invention is to provide a watertight camera housing for use about the waterline in which the aforesaid disadvantages are eliminated or at least substantially reduced.

SUMMARY OF THE INVENTION

To this end the present invention consists of a watertight camera housing which is made from a flexible waterproof material and which is shaped to accommodate a camera having a lens and a viewfinder including projecting parts, the flexibility of the material being such that the camera controls are operable through the material when the camera is accommodated in the housing, characterised in that said housing has two portions which project from the main body of the housing and are provided respectively with a lens port and a viewing port, each made of a transparent material, the said two portions being shaped to accommodate the projecting parts of the camera lens and viewfinder and to locate the lens port and viewing port with respect to the camera lens and viewfinder respectively when the camera is accommodated in the housing, and the viewing port being so arranged as to permit viewing substantially throughout that range of the camera viewfinder, which is suitable for use in the operative environment of the camera.

By means of the invention, it is a simple matter to place the camera in the housing, locate the two projecting portions respectively over the camera lens and viewfinder and close the housing with a suitable waterproof closure, e.g. a waterproof zipper, and connect up any audio connections through a suitable water tight fitting in the material of the housing.

If desired the housing may be provided with a valve for introducing air to provide buoyancy and/or the housing may be provided with a suspension point, e.g. a shackle, for attachment to a rope or cable from e.g. a waterbourne vessel.

The viewing port may be arcuate to provide a radius of curvature sufficient to permit said viewing substantially throughout the said operative range of the camera viewfinder.

In another embodiment, the projecting portions are provided with respective reinforcements to locate positively the lens port and viewing port with respect to the camera lens and viewfinder respectively. Preferably, one of the projecting portions is provided with an annular reinforcing collar, in which the lens port is retained, the collar extending inwardly into the projecting portion to fit loosely around the end of the projecting part of the lens of the camera. The other one of the projecting portions is preferably a cylindrical pocket formed from a flexible rubber material, which is attached at one end, in a watertight manner, to the material of the housing and which extends from the housing and has the viewing port retained in a reinforcement in the other end thereof, the flexibility of said rubber material enabling the camera viewfinder to be maneuvered in arcuate manner so as to permit viewing substantially throughout the said range of the viewfinder. This reinforcement may also be in the form of an annular reinforcing collar.

The invention may also consist of the combination of a camera and any of the waterproof housings defined hereinabove.

In order that the invention may be more readily understood, reference will now be made, by way of example, to the accompanying drawings.

DESCRIPTION OF THE DRAWINGS

FIG. 3 is a side elevation of a waterproof housing, in accordance with one embodiment of the present invention, for a camera, and suitable for the broadcasting camera of FIGS. 1 and 2.

FIGS. 4 and 5 are front and rear end views respectively of the housing of FIG. 3, FIGS. 6 and 7 are top plan and underneath plan views of the housing of FIG. 3, FIG. 8 is a detail cross-sectional view to an enlarged scale of one way of sealingly securing the lens port to the housing material, FIG. 9 is a detail cross-sectional view to an enlarged scale of one way of sealingly securing the viewing port to the housing material, FIG. 10 is a side elevation of the camera housing with the camera of FIG. 1, accommodated within, FIG. 11 is a side elevation of a waterproof camera housing, in accordance with another embodiment of the present invention, with the camera therewithin.

FIG. 13 is a top plan view of the housing of FIG. 11, with the camera accommodated within, FIG. 14 is an elevation of the other side of the housing of FIG. 11.

DETAILED DESCRIPTION OF THE INVENTION

Figure 1:
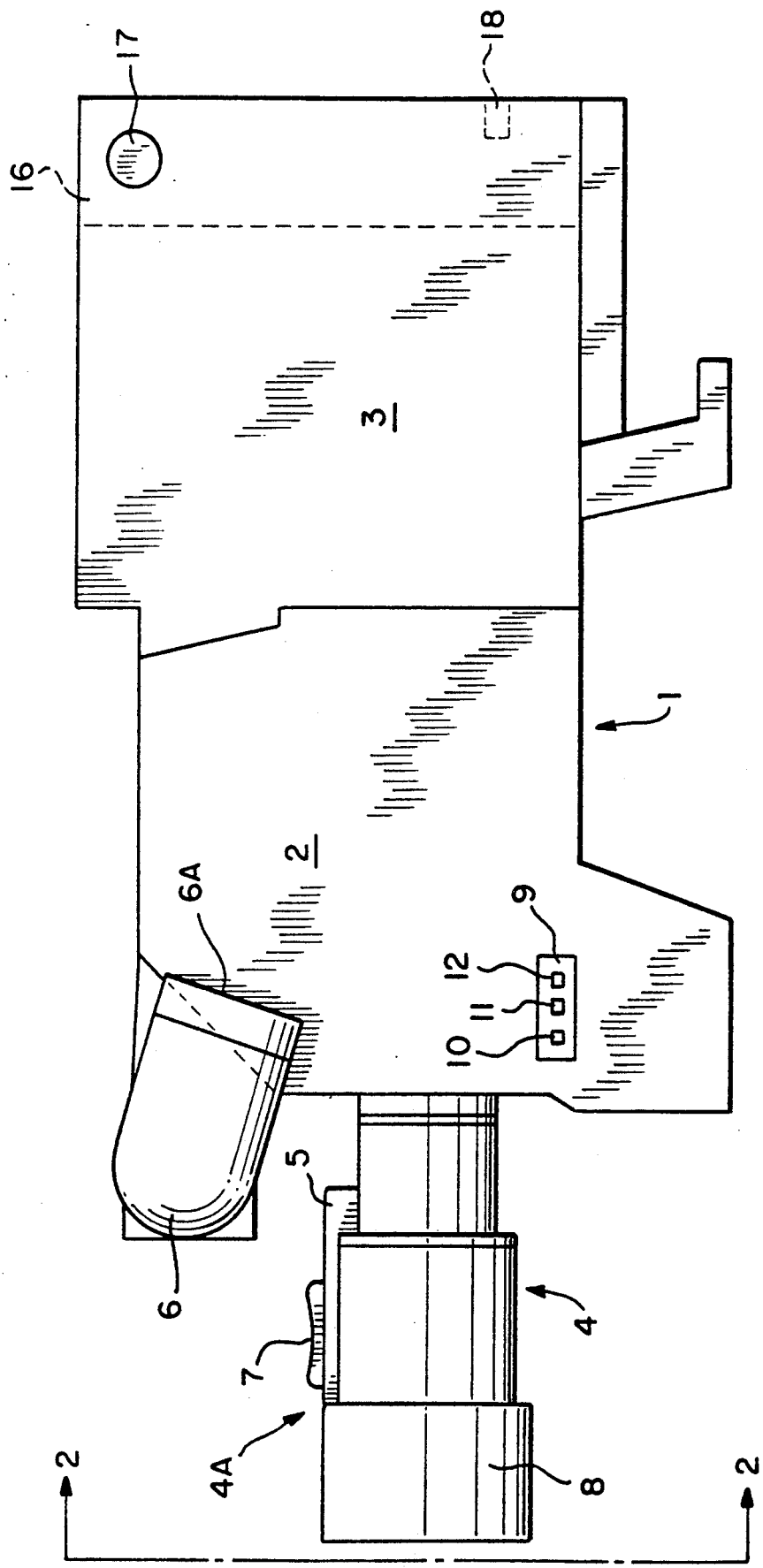
FIGS. 1 and 2 are a side elevation and a front end view respectively of one form of television broadcasting camera.
Figure 2:
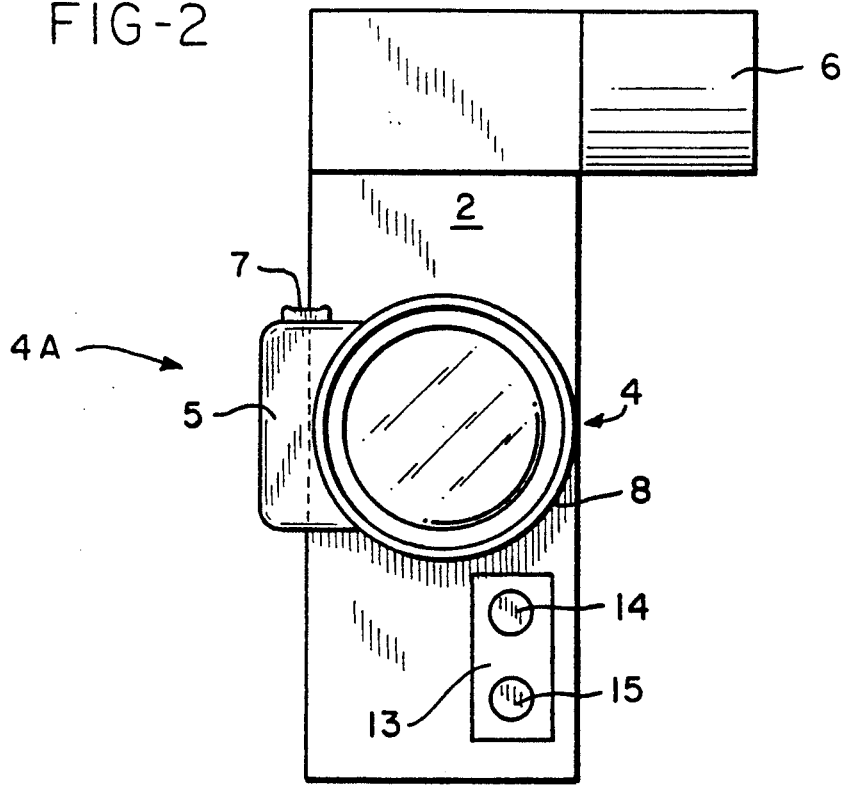
Figure 4:
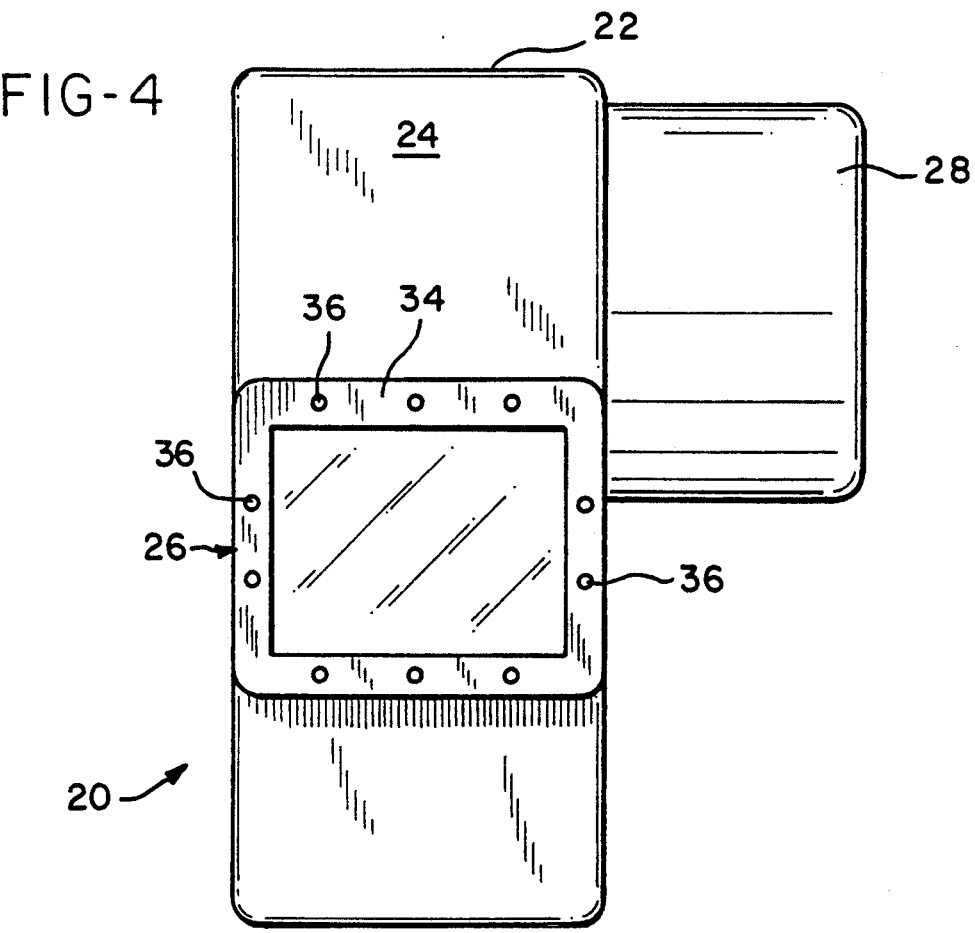

Referring to FIGS. 1 and 2 of the drawings, the television broadcasting camera 1 comprises a camera proper 2 and a recorder 3 for recording sound and vision on tape. The camera proper 2 has a zoom lens 4 operated by a zoom servo-unit 5, and a viewfinder 6. The camera controls include a zoom control switch 7, a focus ring 8, a side panel 9 having a standby switch 10 a gain switch 11 and a color bars switch 12, and a front panel 13 having a video tape start/stop button 14 and a white/black balance switch 15. The combination of the lens 4, servo-unit 5, zoom control switch 7, and focus ring 8 is collectively referred to as the extended lens assembly 4A. The power for operating the camera 1 comes from a battery pack 16 in the recorder 3 with there being a power on/off switch 17. In the rear wall of the recorder 3, there is provided an MIC input socket 18 in FIG. 1.

Referring now to FIGS. 3 to 7 of the drawings, there is shown one embodiment of a waterproof housing which is in the form of a generally rectangular collapsible bag 20 and which is shaped and dimensioned to accommodate the television broadcasting camera 1 shown in FIGS. 1 and 2. The housing 20 is made from a flexible waterproof material which, in the embodiment illustrated, is constituted by a polyurethane coated "Nylon" (Trade Mark) fabric. Applicant has found that a 9 oz weight of such a fabric is suitable for the camera 1.

The bag 20 has a waterproof closure in the form of a zipper 21 which extends for substantially the entire lengths of the upper wall 22 and rear end wall 23 of the bag 20 to facilitate insertion of the camera 1 into the bag. The front end wall 24 of the bag 20 is provided with a shaped portion in the form of a pocket 25 having a lens port 26 of "Perspex" (Trade Mark) or other suitable transparent material. The pocket 25 is shaped to locate the camera lens 4 with respect to the lens port 26 and to accommodate the extended lens assembly 4A with a loose fit, as illustrated in FIG. 10. One of the side walls, the left hand wall 27, of the bag 20 is provided with a shaped portion in the form of a generally cylindrical pocket 28 having an arcuate viewing port 29 of "Perspex" (Trade Mark),or other suitable transparent material, secured to the curved surface of the pocket 28 a will be more readily apparent from FIGS. 5 and 6. The pocket 28 is shaped to locate the viewing port 29 with respect to the camera viewfinder 6 and to accommodate, with a loose fit, the viewfinder 6. The viewing port 29 has a radius of curvature of 7.5 cm which is sufficient to permit viewing, without movement of the port 29, over the entire range of the camera viewfinder 6.

The rear wall 23 of the bag 20 is provided with a tubular connector 30, e.g. of rubber, which is integral with a seal 31 secured to the rear wall 23. The tubular connector has a bore which is undersized with respect to the microphone cable (not shown) which when the camera is accommodated within the bag 20 extends through the tubular connector 30 with a watertight fit and has a jack for connection to the MIC socket 18 in the rear wall of the recorder 3.

Since, when the camera is accommodated in the bag 20 the assembly has negative buoyancy, the rear wall 23 is provided with a suspension shackle 32, e.g. of rubber, to which a rope or cable may be connected to prevent the camera sinking if the operator should loose hold. However, the embodiment illustrated may have provision for positive buoyancy in the form of a valve 33, illustrated in chain lines, by means of which the bag 20 can be inflated with air.

As shown in FIG. 9, the lens port 26 is fixed to the material of the bag 20 by means of outer and inner rings 34 and 35 respectively which clamp the material of the bag 20 between them in watertight manner by means of screws 36. (FIG. 5). The screws 36 pass through countersunk holes such as 37 in the outer ring 34 and into screw threaded holes 38 in the inner ring 35. The lens port 26 is secured in position by a suitable waterproof cement or adhesive 39 in a channel 40 formed by the rings 34 and 35. The rings 34 and 35 may be made of any suitable material but plastics is preferred. The arcuate viewing port 29 is conveniently secured to the material of the bag 20 by means of a seal 41, e.g. of rubber, fixed by a suitable waterproof adhesive to the bag material and the port 29 with the port also being adhesively secured to material as indicated at 42.

FIG. 10 shows the bag 20 in chain lines with the camera 1 accommodated therein with the lens port 26 and viewing port (not visible) being located with respect to the camera lens 4 and camera viewfinder 6 by the pockets 25 and 28 respectively. As will be appreciated the entire camera 1, the lens 4 and the viewfinder 6 are accommodated in the bag 20, the pocket 25 and the pocket 28 respectively with a loose fit. Moreover, the distance of the rear wall of the bag from the rear wall 19 of the tape recorder is such as to provide sufficient space for ease of plugging in the microphone cable jack into the socket 18.

The flexibility and thickness of the material of the bag is such that the controls 7, 8, 10, 11, 12, 14, 15 and 17 can be felt and operated through the bag material.

Figure 12:
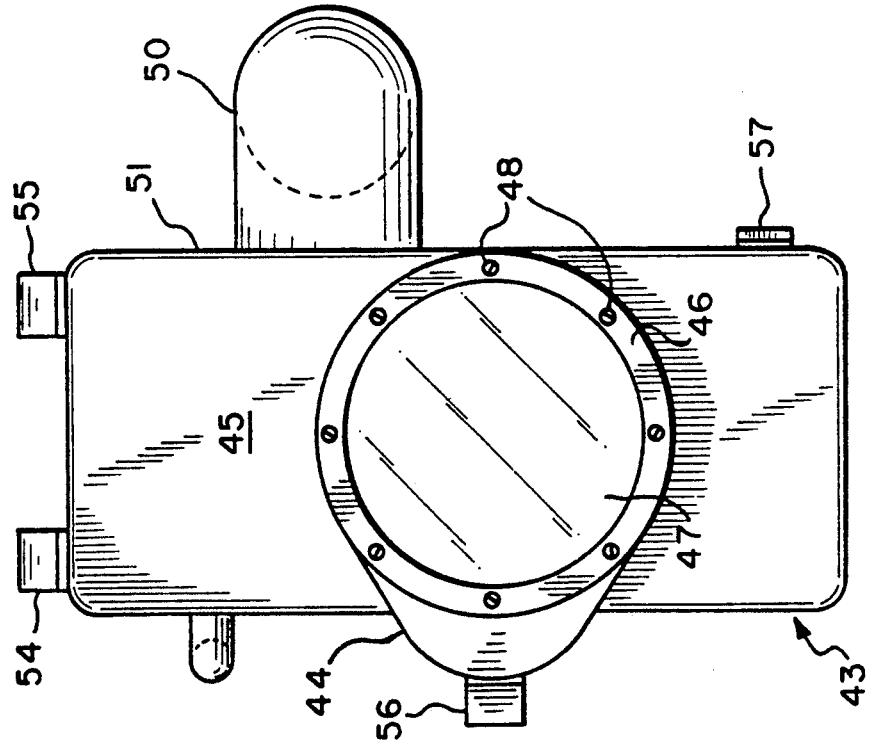
FIG. 12 is a front end view of the housing of FIG. 11.

Referring now to FIGS. 11 to 14, there is shown another embodiment of the waterproof housing. This housing is also in the form of a generally rectangular collapsible bag 43, which is shaped and dimensioned to accommodate the television broadcasting camera 1 (shown in dashed lines) and is made from the same material as the bag 20. A shaped portion in the form of a pocket 44 is formed in the front end wall 45 of the bag 43. This pocket 44 is reinforced by an annular reinforcing collar 46, preferably formed from a suitable rigid plastics material, in which a lens port 47 is retained. The collar 46 extends inwardly into the pocket 44 and is intended to fit loosely over the light gathering end of the extended lens assembly 4A so as to locate positively the lens port 47 with respect to the end of the extended lens assembly 4A. The pocket 44 is also shaped to accommodate the servo-unit 5 and zoom control switch 7 of the camera 1. The annular collar 46 consists of two parts, which clamp the material of the bag 43 in watertight manner by means of screws 48, as shown in FIG. 12.

Figure 15:
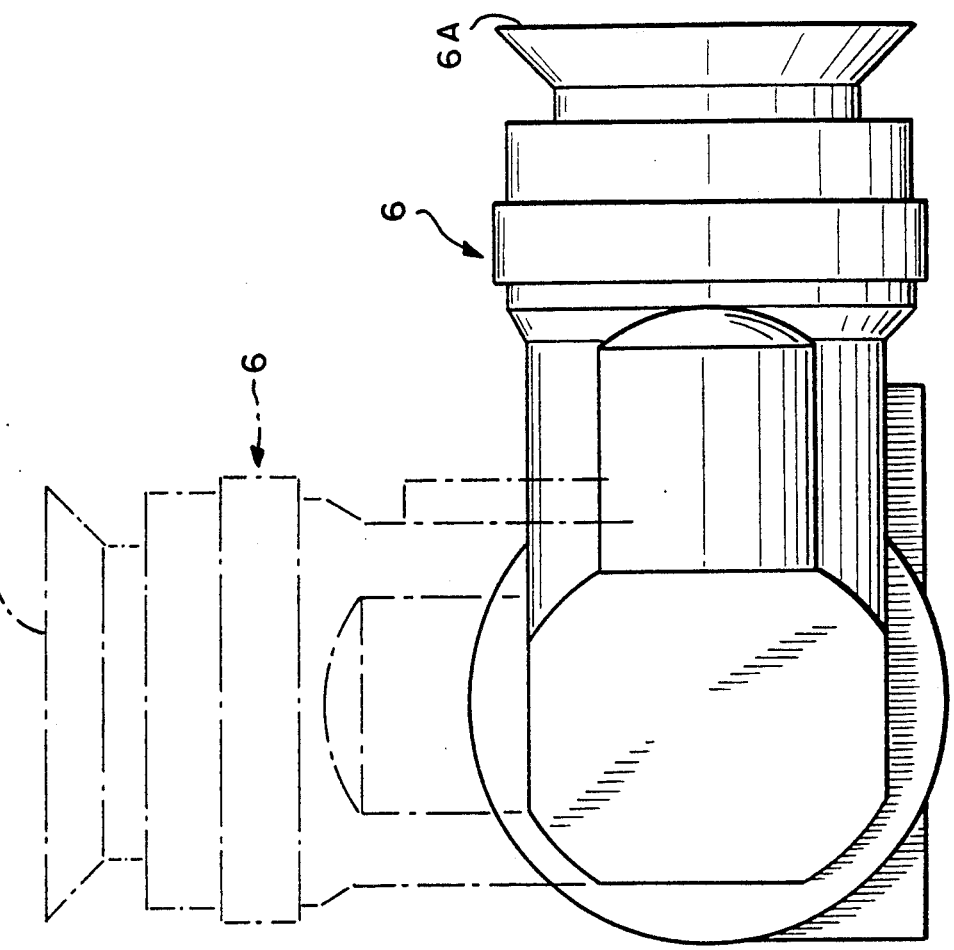
FIG. 15 is a schematic illustration of the useful range of the camera viewfinder.

Side wall 49 of the bag 43 is provided with another shaped portion in the form of a cylindrical pocket 50 made from a flexible rubber material for accommodating the camera viewfinder 6. The cylindrical pocket 50 is joined at one end 51, in a watertight manner, to the material of the bag 43 and extends in an arcuate configuration from the bag. A viewing port 52 is retained in an annular reinforcing collar 53 attached in watertight manner, to the outer end of the cylindrical pocket 50. Consequently, the reinforcement provided by the annular collar 53 enables the viewing port 52 to be positively located with respect to the viewing end 6A of the camera viewfinder. As illustrated in FIG. 13, this positive location of the viewing port 52 with the viewing end 6A of the camera viewfinder 6 is accomplished by virtue of the fact that the annular collar 53 and the viewing port 52 fit over the viewing end 6A of the camera viewfinder 6. Also in this second embodiment instead of the viewing port 52 itself being arcuate, it is planar, but is attached to the flexible cylindrical pocket 50 which permits the camera viewfinder to be maneuvered in an arcuate manner, thereby permitting viewing substantially throughout the operative range of the viewfinder. In this particular embodiment, the camera viewfinder can be maneuvered in an arcuate manner through a range subtends an angle of approximately 180° from a vertical downward direction to a vertical upward viewing direction. However, the range of the viewfinder, which is actually suitable for use in the underwater operative environment of the camera, normally subtends an angle of approximately 90° for example from a horizontal viewing direction to a vertical viewing direction, as illustrated schematically by the viewfinder 6 in FIG. 15. It is therefore only, in fact, necessary for the viewing port to be arranged to permit viewing substantially throughout the whole of this useful operative range.

As in the first embodiment, the bag 43 is also provided with a waterproof zipper 59 and all joints between the materials of the bag are covered by a compatible plastics material to ensure that they are watertight. Straps 54 to 57 and a shackle 58 are also attached to the outside of the bag to enable the camera, when accommodated in the bag, to be carried or otherwise supported.

Although preferred embodiments have been described, it should be appreciated that the invention includes all modifications and variations falling within its scope. Thus, the invention is applicable to waterproof housings for video cameras of the home video type and to cameras with or without an audio facility.

Also it will of course be envisaged that the useful operative range of the camera may be less than or greater than 90° for example between approximately 80° to 100°.

What is claimed is:

1. A watertight housing for enclosing a camera, said camera having an extended lens assembly and a viewfinder, said extended lens assembly having a first end at which said extended lens assembly is attached to said camera and a second end through which light is gathered, said viewfinder having a viewing end and being moveable through an operative range, said housing comprising:

a main body constructed of a flexible, waterproof material having sufficient flexibility to allow said camera to be operated through said material when said camera is enclosed in said housing;

a first portion projecting from said main body constructed of said flexible, waterproof material, shaped to accommodate said extended lens assembly, having a transparent lens port, and having a reinforcement means to locate positively said lens port with respect to said second end of said extended lens assembly;

a second portion projecting from said main body constructed of said flexible, waterproof material, having a planar viewing port arranged to permit viewing substantially throughout said operative range of said camera viewfinder, and having a reinforcement means to locate positively said planar viewing port with respect to said viewing end of said camera viewfinder, said reinforcement means being an annular reinforcing collar in which said planar viewing port is retained, said annular reinforcing collar fitting over said viewing end of said camera viewfinder.

2. A housing as claimed in claim 1 wherein said reinforcement means provided in said first projecting portion is an annular reinforcing collar in which said lens port is retained, said annular reinforcing collar extending inwardly into said first projecting portion to fit over said second end of said extended lens assembly.

3. A housing as claimed in claim 1 wherein said second projecting portion is a curved cylindrical pocket conformingly shaped to accommodate said camera viewfinder, sad cylindrical pocket having a first end at which said cylindrical pocket is attached to said main body and a second end at which said viewing port is located.

4. A housing as claimed in claim 3 wherein said second projection portion is flexible to enable said camera viewfinder to be maneuvered in an arcuate manner.

5. A housing as claimed in claim 1 wherein said housing further comprises straps to enable said camera, when accommodated within said housing, to be carried or otherwise supported.

6. A housing as claimed in claim 1 wherein said housing further comprises a suspension shackle to enable said camera, when accommodated within said housing, to be carried or otherwise supported.

7. A housing as claimed in claim 1 wherein said housing further comprises a waterproof closure in the form of a waterproof zipper.

8. In combination, a housing as claimed in claim 1 and a camera.

* * * * *